No. 784,757.
PATENTED MAR. 14, 1905.
J. H. REDFIELD.
MEANS FOR COUPLING MOTORS TO ROCK DRILLS.
APPLICATION FILED APR. 27, 1904.
3 SHEETS—SHEET 1.
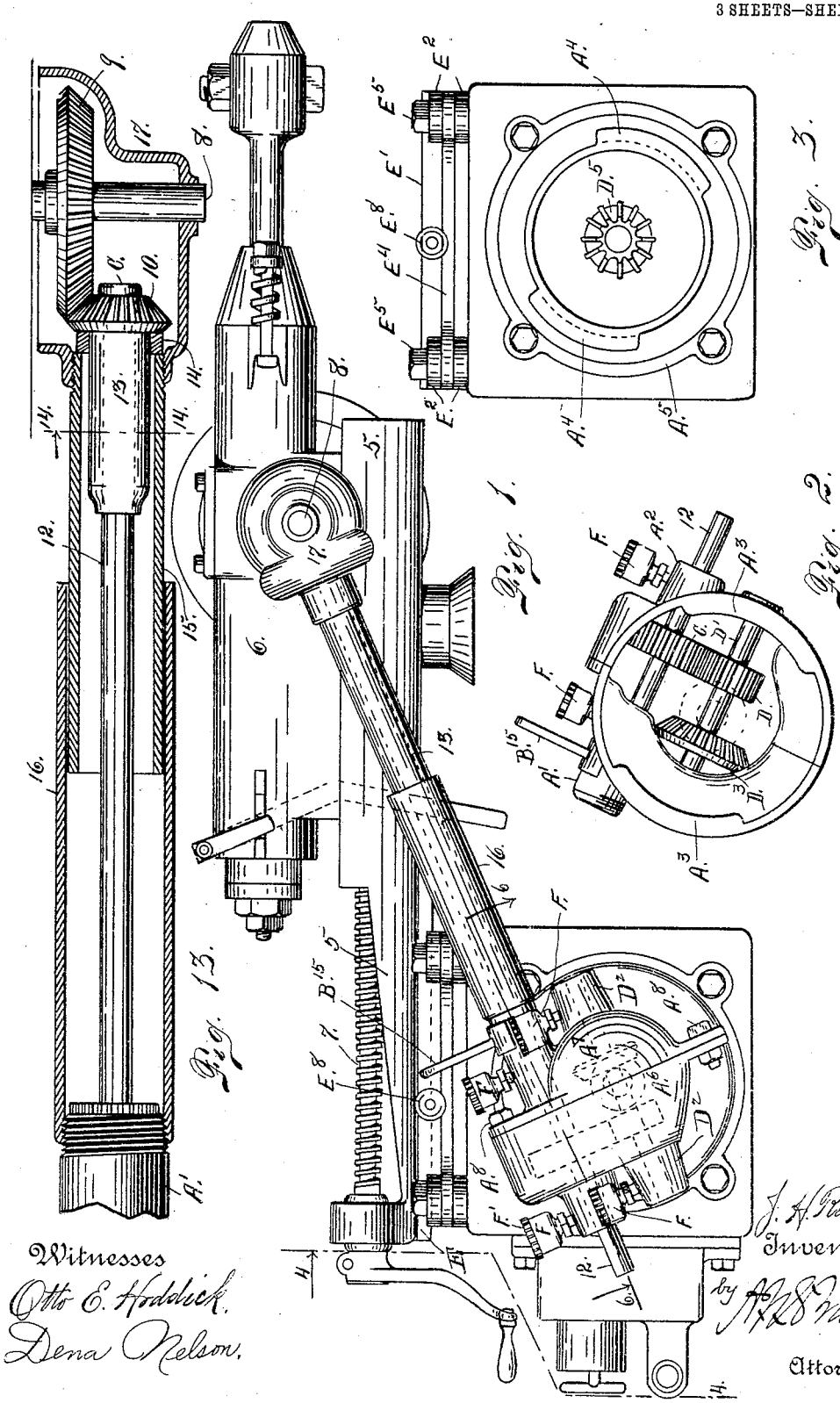

No. 784,757. PATENTED MAR. 14, 1905.
J. H. REDFIELD.
MEANS FOR COUPLING MOTORS TO ROCK DRILLS.
APPLICATION FILED APR. 27, 1904.
3 SHEETS—SHEET 2.
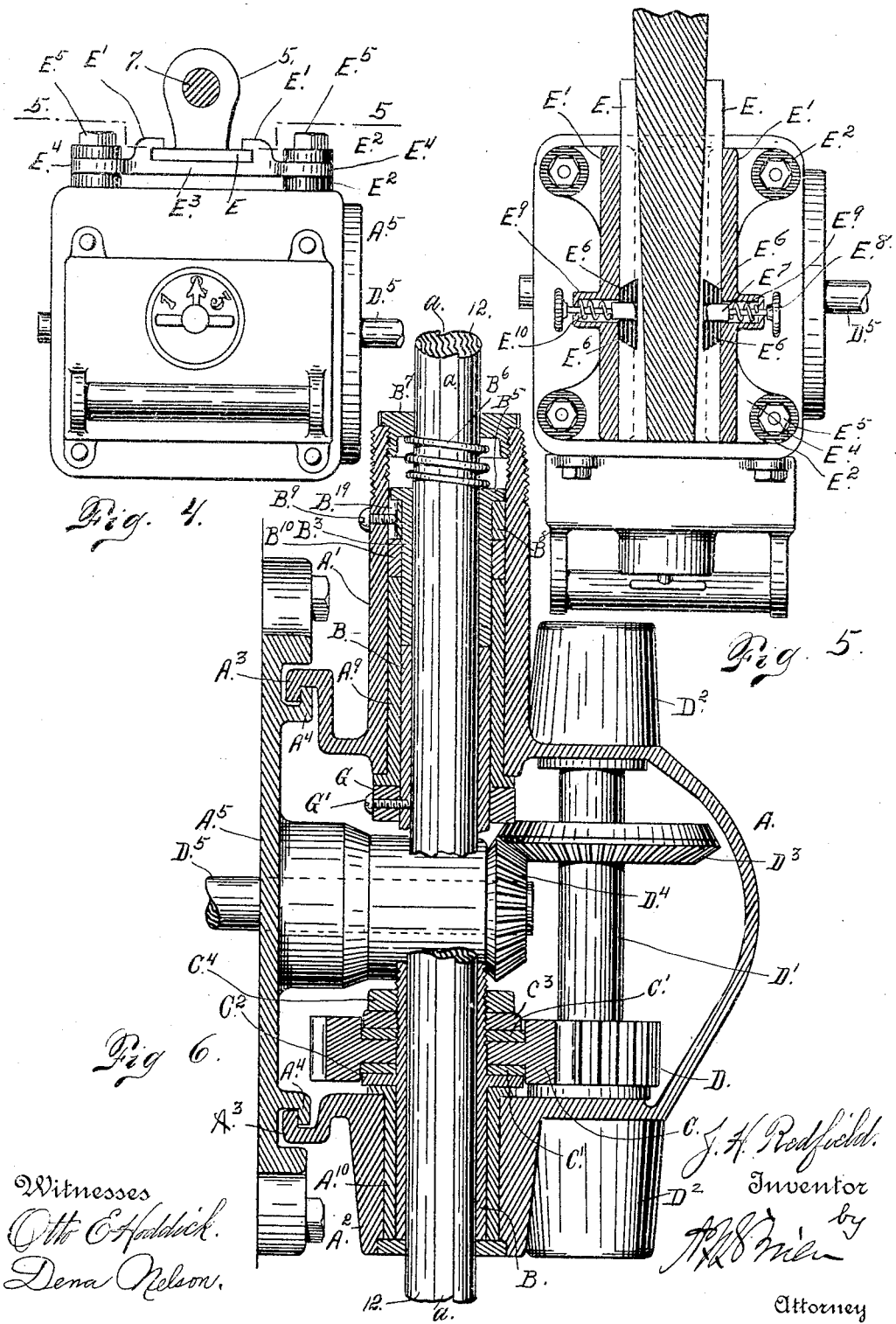

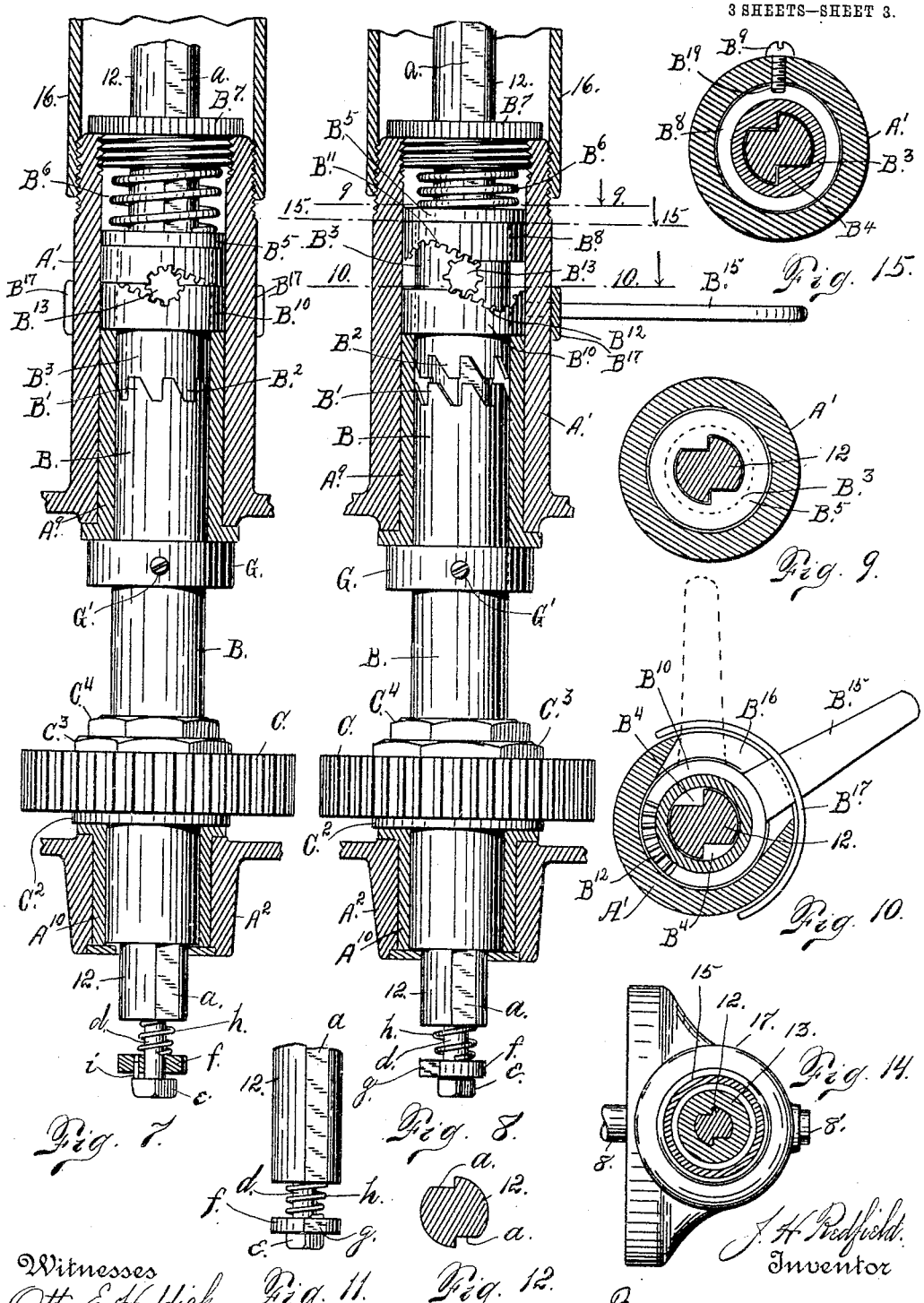

No. 784,757.  Patented March 14, 1905.

UNITED STATES PATENT OFFICE.

JOHN H. REDFIELD, OF DENVER, COLORADO, ASSIGNOR OF ONE-HALF TO FRED GRUTT, OF DENVER, COLORADO, AND CHARLES GRUTT AND EMIL GRUTT, OF DAVENPORT, WASHINGTON.

MEANS FOR COUPLING MOTORS TO ROCK-DRILLS.

SPECIFICATION forming part of Letters Patent No. 784,757, dated March 14, 1905.

Application filed April 27, 1904. Serial No. 205,210.

*To all whom it may concern:*

Be it known that I, JOHN H. REDFIELD, a citizen of the United States of America, residing in the city and county of Denver and State of Colorado, have invented certain new and useful Improvements in Means for Coupling Motors to Rock-Drills and Similar Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for coupling or connecting the operating-motor with rock-drills or similar machines.

This invention is intended to do away with the necessity or requirement for a flexible shaft to form the connection between the motor and the operating-shaft of the drill. The flexible shaft is a very expensive device and is comparatively short-lived. In my improvement the motor is suspended on the guide-shell of the machine, and the coupling mechanism includes telescoping parts to compensate for the movement of the casing as it slides back and forth on the guide-shell. The casing containing the gears for transmitting motion from the armature-shaft to the main operating-shaft of the mechanism is revolubly mounted on the motor-casing to permit the necessary movement or change in inclination of the telescoping parts during the back-and-forth sliding movement of the drill casing or body upon the guide-shell. The main shaft of the coupling mechanism passes entirely through the gear-case and slides freely therein as the drill-casing moves back and forth. The extremity of this shaft adjacent the drill-casing is fixed to move with the said casing, since the gear connected with this extremity of the shaft meshes with a gear on the operating-shaft of the drill, the two gears being inclosed in a suitable housing or gear-case. The main operating-shaft of the coupling mechanism is of sufficient length to permit the desired or necessary range of movement without interfering with the operation of the mechanism.

Having briefly outlined my improved construction, as well as the function it is intended to perform, I will proceed to describe the same in detail, reference being made to the accompanying drawings, in which is illustrated an embodiment thereof.

In the drawings, Figure 1 is a side elevation of my improved coupling mechanism, shown connected in operative relation with a drill. Fig. 2 is an inside view of the gear-case and gears with which the gear on the armature-shaft coöperates. Fig. 3 is a detail view of the motor with the mechanism shown in Fig. 2 removed. Fig. 4 is an end view of the motor or a view taken at right angles to Fig. 3, the motor being shown mounted on the drill, whose screw-shaft is shown in section, taken on the line 4 4, Fig. 1. Fig. 5 is a section taken on the line 5 5, Fig. 4, looking downwardly. Fig. 6 is a section taken on the line 6 6, Fig. 1, the parts being shown on a larger scale. Figs. 7 and 8 are similar sections with parts broken away, the armature-shaft and the pinion thereon being omitted. In these views the clutch mechanism is shown in two positions. Figs. 9 and 10 are sections taken on the lines 9 9 and 10 10, respectively, of Fig. 8. Fig. 11 is a detail view of the lower extremity of the operating-shaft of the coupling mechanism. Fig. 12 is a cross-section of the said shaft. Fig. 13 is a section taken through the telescoping parts of the coupling, showing the operating-shaft connected with the drill. Fig. 14 is a section taken on the line 14 14, Fig. 13. Fig. 15 is a section taken on the line 15 15, Fig. 8.

The same reference characters indicate the same parts in all the views.

Let 5 designate the guide-shell of a rock-drill, 6 the casing or body of the drill, slidably mounted on the guide-shell, and 7 the feed-screw, suitably journaled. The operating-shaft 8 of the drill is provided with a fast bevel-gear 9, meshing with a pinion 10, made fast to one extremity of the coupling-shaft 12, operated from the motor, as hereinafter described. The pinion 10 is made fast to a sleeve 13, the latter being splined on the shaft 12, whereby the sleeve and pinion rotate in unison therewith. The shaft, however, is permitted a longitudinal movement in the sleeve or the sleeve on the shaft, as may be desired. The pinion 10 is held in operative or meshing engagement with the gear 9 by a washer 14, interposed between the pinion and the upper extremity of the telescoping tubular part 15, which coöperates with the tubular part 16, screwed to a bearing A' of the lower gear-case A. The telescoping part 15 is screwed into a housing 17, mounted on the shaft 8 of the drill and inclosing the gears 9 and 10. The case A is also provided with a bearing $A^2$ and flanges $A^3$, interlocking with flanges $A^4$, mounted on the motor-casing $A^5$. The flanges $A^3$ and $A^4$ are interrupted, as shown in Figs. 2 and 3, whereby they may be interlocked with or detached from each other by a partial rotary movement. It is evident from this construction that the gear-case A may have a rotary movement on the motor-casing as the body 6 of the drill is moved back and forth to allow the telescoping parts to change their inclination. The gear-case A is composed of two parts $A^6$ and $A^7$, connected by bolts $A^8$. The bearings A' and $A^2$ of this gear-case are provided with bushings $A^9$ and $A^{10}$, through which the shaft 12 passes. This shaft 12 is provided with longitudinal grooves $a$, adapted to receive ribs, tongues, or splines with which the parts are provided, which normally rotate therewith. The grooves $a$ extend the whole length of the shaft 12, and the latter moves freely through all of the parts with which it is connected. In order to prevent the shaft from dropping out when in the position shown in Fig. 1, its upper extremity is provided with a cap $c$. In order to prevent the shaft from sliding through its connections when the coupling mechanism is disengaged from the drill, the lower extremity of the shaft is provided with a reduced extension $d$, having a head $e$. Upon the extension $d$ is mounted a washer $f$, provided with notches $g$, which normally register with the longitudinal grooves $a$ of the shaft. However, if it is not desired to have the shaft slide out of its connected parts the washer is pushed inwardly against a coil-spring $h$ far enough to disengage it from a pin $i$, made fast to the head $e$ of the extension. The washer may then be turned to bring its notches $g$ out of register with the grooves $a$ of the shaft, after which the washer returns to engagement with the head $e$, and the pin $i$ engages another hole therein.

Surrounding the shaft 12 and fitting within the bushings $A^9$ and $A^{10}$ is a sleeve B, which is normally loose on the shaft. The upper extremity of this sleeve B is provided with teeth B', adapted to interlock with the teeth $B^2$ of a clutch-sleeve $B^3$, splined on the shaft or having tongues $B^4$, (see Fig. 10,) engaging the grooves $a$ of the shaft 12. When the teeth B' and $B^2$ of the clutch-sleeves B and $B^3$ interlock, as shown in Fig. 7 of the drawings, the shaft 12 will be rotated by the rotation of the motor. When, however, these clutch-sleeves are disengaged, as shown in Fig. 8, the rotation of the armature-shaft will not impart rotary movement to the shaft 12. The extremity of the sleeve $B^3$ remote from the teeth $B^2$ is provided with a head $B^5$, which engages a spring $B^6$, interposed between the head $B^5$ and a screw-cap $B^7$, screwed into the adjacent extremity of the bearing A'. Surrounding the clutch-sleeve $B^3$ immediately below the head $B^5$ is a collar $B^8$, which is loose on the sleeve $B^3$, but locked against rotary movement by a screw $B^9$, threaded into the bearing A' and engaging a vertical groove $B^{10}$, formed in the collar $B^8$. Below the collar $B^8$ is a coöperating collar $B^{10}$, which is free to turn on the sleeve $B^3$. The two collars $B^8$ and $B^{10}$ are provided with inclined toothed adjacent edges $B^{11}$ and $B^{12}$, respectively. Between the toothed edges of these two collars is located a loose pinion $B^{13}$. When the clutch members B and $B^3$ are in engagement, the pinion $B^{13}$ occupies the position shown in Fig. 7. When it is desired to separate the collars for the purpose of disengaging the interlocking teeth of the clutch-sleeves, the collar $B^{10}$ is given a partial rotary movement, whereby the pinion $B^{13}$ is rotated sufficiently to force the collar $B^{11}$ upwardly against the head $B^5$ of the clutch-sleeve $B^3$, whereby the latter is actuated or moved on the shaft 12 sufficiently to disengage its teeth from the teeth of the other clutch-sleeve. The collar $B^{10}$ is rotated through the instrumentality of a lever-arm $B^{15}$, which passes through a slot $B^{16}$, formed in the bearing A', its inner extremity being made fast to the said collar. The slot $B^{16}$ is closed against the entrance of dirt or foreign particles of matter by a guard $B^{17}$, which is attached to and moves with the lever-arm $B^{15}$. Mounted on the lower part of the clutch-sleeve B is a gear C, interposed between two fiber washers C'. The lower fiber washer engages a shoulder $C^2$, fast on the sleeve B. The upper fiber washer is engaged by a nut $C^3$, screwed on the sleeve B, while above the nut $C^3$ is a lock-nut $C^4$. These nuts when tightly screwed lock the gear C on the sleeve sufficiently for ordinary purposes. If, however, the movement of the drill should be suddenly stopped, whereby the shaft 12 could not rotate without breakage, the gear C would turn on the sleeve B until the mechanism could be thrown out of gear by the operation of the lever-arm $B^{15}$.

The gear C meshes with a pinion D, fast on a short shaft D', journaled in bearings $D^2$, formed in the gear-case A. Mounted also on the shaft D' is a beveled gear $D^3$, which meshes with a gear $D^4$, fast on the armature-shaft $D^5$.

The guide-shell 5 of the drill is provided with longitudinally-arranged bottom flanges E, engaged by flanges E', formed on a plate $E^3$, mounted on top of the motor-casing $A^5$ and interposed between a number of pairs of washers $E^2$. The plate $E^3$ is provided with four apertured ears $E^4$, each ear being located between a pair of rubber washers $E^2$. Bolts $E^5$ are passed through registering apertures formed in the washers $E^2$ and the ears $E^4$ and threaded into the motor-casing. In this way the motor is relieved from the shock or vibration incident to the operation of the drill mechanism. This is a very important feature in apparatus of this class, since the motor mechanism is exceedingly sensitive to vibrations, jars, and concussions such as are incident to the operation of rock-drills or similar mechanism. In order to further accomplish this end, the flanges E are cut away on opposite sides to receive two pairs of rubber cushions $E^6$. Between each pair of cushions $E^6$ is located the inner extremity of a pin $E^7$, having an outer head $E^8$. Each flange E' of the plate $E^3$ is provided with a casing $E^9$, in which is located a coil-spring $E^{10}$, which acts on the inner extremity of the pin $E^7$ to force the latter into the opening between the cushions $E^6$. This mechanism further relieves the motor from jars or vibrations incident to the operation of the drill mechanism.

In mounting the motor upon the supporting-flanges E the pins $E^7$ are drawn outwardly by pulling on their heads $E^8$ until the flanges E' are moved far enough to prevent the pins from moving inwardly. Then when the motor is moved to its position upon the flanges E the pins $E^7$ will spring into place between the cushions $E^6$ on opposite sides.

In order to facilitate the lubrication of the bearings of the shafts working in the gear-case A, the latter is provided with a number of oil-cups F, which are provided with screw-caps having milled heads F'.

From the foregoing description the use and operation of my improved device will be readily understood. The motor is mounted on the guide-shell of the drill in a manner heretofore described, whereby it is given a cushioned mounting to obviate or overcome the vibrations incident to the operation of the drill, as explained. The coupling mechanism is then connected with the outer plate of the motor in a manner described, and particularly shown in Fig. 6 of the drawings. After the connections have been made and the motor set in motion it is evident that rotary movement will be communicated to the driving-shaft 8 of the drill through the instrumentality of the various elements heretofore explained, assuming that the device is in gear or that the clutch-sleeves B and $B^3$ are in operative engagement, as shown in Fig. 7. When it is desired to throw the device out of gear or stop the rotation of the shaft 12, the collar $B^{10}$ is given a partial rotary movement, whereby the clutch-sleeves are separated, allowing the motor to run without operating the drill. The sleeve B is provided with a collar G, which is made fast thereto by a screw G'. The sleeve B is also provided with a collar $C^2$, which is fast thereon below the gear C. The collar $C^2$ prevents the sleeve from moving in one direction, and the collar G prevents it from moving in the opposite direction.

Having thus described my invention, what I claim is—

1. The combination with the guide-shell, of a rock-drill or similar machine, of an electric motor yieldingly suspended therefrom, and an operative connection between the motor and the drill, including tubular telescoping parts whereby the coupling is extensible to compensate for the back-and-forth movement of the drill-body on the guide-shell.

2. The combination with a drill or similar machine having a guide-shell and a body part movable longitudinally thereon, of a motor yieldingly connected with the guide-shell, and an operative connection between the motor and the power-shaft of the drill, comprising an operating-shaft, a gear connection between the shaft and the motor-armature, a gear connection between the operating-shaft of the coupling and the operating-shaft of the drill, the coupling-shaft being movable longitudinally to allow the drill to move back and forth on the guide-shell without changing the position of the motor, telescoping sleeves surrounding the shaft and forming a protection therefor, and gear-cases with which the telescoping sleeves are respectively connected, the gear-case connected with the motor being mounted thereon to permit a partial rotary movement for the purpose set forth.

3. The combination with a drill, a guide-shell and an electric motor, of a cushion connection between the guide-shell and the motor whereby the latter is yieldingly suspended on the shell to prevent or overcome the vibration incident to the operation of the drill.

4. The combination of a drill, a guide-shell and a motor, of a cushion connection between the guide-shell and motor for arresting the vibrations which would otherwise be communicated from the drill to the motor during the operation of the drill.

5. The combination with a guide-shell and drill, of a plate slidably mounted on the guide-shell, a motor, bolts for connecting the motor with the plate, and cushion-washers located on opposite sides of the plate, the bolts passing through registering openings formed in the washers and plate, substantially as described.

6. The combination with a drill, of a guide-shell provided with flanges, a plate having flanges forming ways which the flanges of the guide-shell enter, a motor, cushion-washers located between the motor and plate, and bolts for securing the plate to the motor, and cushion-washers interposed between the heads of the bolt and the plate.

7. The combination with a drill and guide-shell, of a track mounted on the guide-shell, a plate provided with ways which engage the track, cushions inserted in the track on opposite sides, spring-actuated devices mounted on the flanges of the plate and adapted to pass between the said track-cushions when the plate is in position, a motor and a cushion connection between the motor and the plate, substantially as described.

8. The combination with a drill and guide-shell, of a motor suspended from the guide-shell, a gear-case movably connected with the motor, a shaft journaled in said gear-case, a gearing connection between said shaft and the armature of the motor, a second shaft passing through the gear-case at right angles to the first-named shaft, a sleeve through which the second shaft passes, a gearing connection between the said sleeve and the first-named shaft, the said sleeve having clutch-teeth at one extremity, a second sleeve having coöperating teeth, the second sleeve being splined on the second shaft, a gearing connection between the second shaft and the operating-shaft of the drill, the second sleeve being capable of longitudinal movement on the second shaft, and means for actuating the second sleeve to disengage the coöperating teeth of the two sleeves.

9. The combination with a drill, a guide-shell, and a motor mounted on the guide-shell, of a gear-case mounted to turn on the motor-casing, an operating-shaft passing through the gear-case, a gearing connection between the armature of the motor and the said shaft, clutch members surrounding the shaft one of them being movable, two toothed collars located adjacent each other, a loose pinion interposed between the toothed edges of the collars, the latter being constructed to allow the pinion to occupy a position between them when their body portions are in engagement with each other, the toothed portions of the two collars being inclined whereby a partial rotary movement of one collar separates the two collars by the longitudinal movement of one collar, and a connection between the longitudinally-movable collar and one of the clutch members whereby the latter is actuated sufficiently to disengage the two clutch members for the purpose set forth.

10. The combination with a drill and a motor mounted thereon, of means for coupling the motor with the operating mechanism of the drill including suitable gearing, and a gear-case having flanges interlocking with flanges formed on the motor-casing, the flanges of both parts being interrupted to permit the removal of the gear-case by a partial rotary movement.

In testimony whereof I affix my signature in presence of two witnesses.

JOHN H. REDFIELD.

Witnesses:
A. J. O'BRIEN,
DENA NELSON.